(12) United States Patent
Breish et al.

(10) Patent No.: US 7,093,939 B2
(45) Date of Patent: Aug. 22, 2006

(54) HIGH-SPEED CONTINUOUS LINEAR FILM TRANSPORT SYSTEM

(75) Inventors: Kurt Breish, Garden Valley, ID (US); Dennis Sand, Boise, ID (US)

(73) Assignee: nextScan, Inc., Eagle, ID (US)

( * ) Notice: Subject to any disclaimer, the term of this patent is extended or adjusted under 35 U.S.C. 154(b) by 43 days.

(21) Appl. No.: 10/818,563

(22) Filed: Apr. 5, 2004

(65) Prior Publication Data

US 2005/0219462 A1    Oct. 6, 2005

(51) Int. Cl.
*G03B 1/56* (2006.01)
*G03B 21/48* (2006.01)

(52) U.S. Cl. ...................................... 352/159; 352/180
(58) Field of Classification Search .................. 352/56, 352/159, 166, 180
See application file for complete search history.

(56) References Cited

U.S. PATENT DOCUMENTS

| | | | | |
|---|---|---|---|---|
| 3,716,177 A * | 2/1973 | Leavitt | ............................ | 226/1 |
| 3,937,421 A * | 2/1976 | Fender et al. | ............. | 242/331.2 |
| 4,022,525 A | 5/1977 | Boudouris | ................... | 352/187 |
| 4,245,897 A * | 1/1981 | Beauviala et al. | ........... | 352/180 |
| 4,249,821 A * | 2/1981 | Rudy et al. | ..................... | 355/64 |
| 4,878,067 A * | 10/1989 | Yagoto et al. | ............... | 347/262 |
| 4,958,169 A * | 9/1990 | Mochizuki | ................... | 347/262 |
| 5,106,185 A * | 4/1992 | Blaschek et al. | ............ | 352/180 |
| 5,121,982 A * | 6/1992 | Blaschek et al. | ............ | 352/159 |
| 5,124,743 A * | 6/1992 | Shiota | ........................... | 355/30 |
| 5,753,930 A | 5/1998 | Dutton | .................... | 250/559.02 |
| 5,845,018 A | 12/1998 | Breish | .......................... | 382/276 |
| 5,886,772 A * | 3/1999 | Inatome et al. | .............. | 352/225 |
| 6,038,014 A * | 3/2000 | Adolphi et al. | ................ | 355/55 |
| 6,081,293 A | 6/2000 | Brown et al. | ................... | 348/97 |
| 6,091,446 A | 7/2000 | Walker | .......................... | 348/97 |
| 6,120,151 A | 9/2000 | Stitt | ............................. | 352/184 |
| 6,129,303 A * | 10/2000 | Karaki et al. | ............. | 242/523.1 |
| 6,169,571 B1 | 1/2001 | Rivers et al. | .................. | 348/96 |
| 6,230,616 B1 * | 5/2001 | Steuer | ........................... | 101/23 |
| 6,301,398 B1 | 10/2001 | Kimball et al. | ............. | 382/319 |
| 6,545,264 B1 | 4/2003 | Stern | ........................... | 250/234 |

\* cited by examiner

*Primary Examiner*—Rodney Fuller
(74) *Attorney, Agent, or Firm*—New TechLaw; Gerald B. Rosenberg, Esq.

(57) ABSTRACT

A stable, continuous, high-speed roll film media path is established between supply and take-up film reels. Supply and take-up path segments isolate a core transport path section from significant non-linear forces, thereby enabling continuous, high-speed, high-accuracy scan line imaging of the media. The supply and take-up path segments each operate to continuously maintain open decoupling loops in the film media while accurately controlling the speed, tension and alignment of the film media as transported through the core transport path section. A microcontroller operates two motor driven capstans to establish the film media speed and tension within the core transport path section. Optical sensors provide feedback to the microcontroller in managing two additional motor driven capstans to maintain the decoupling loops. The film media within the core transport path section is thereby isolated from frictive, inertial, and skewing forces that could otherwise degrade the media imaging.

17 Claims, 5 Drawing Sheets

HIGH-SPEED CONTINUOUS LINEAR FILM TRANSPORT SYSTEM

BACKGROUND OF THE INVENTION

1. Field of the Invention

The present invention is generally related to continuous scan film readers and strip digitizer systems and, in particular, to a high-speed, continuous linear film transport system enabling continuous, highly accurate media-based image recognition.

2. Description of the Related Art

Substantial libraries of documents and related graphical image forms of information have been archived over the years on roll film media. In particular, there are a considerable number of large archives of imaged documents stored on roll microfilm. Conversion to a digital form is generally desired to prevent loss of the information due to aging of the film media and to fundamentally improve and ensure permanent access to the documents and information.

Many different roll film transport systems, using either a stop-motion or continuous feed architecture, have been developed over the years. These systems have met with varying degrees of success, depending on the nature of the intended application, when considered based on criteria including accurate image reproduction, total throughput, media wear, ease of operation, and both system and operational cost. Stop-motion systems are typically employed where accurate reproduction and high image resolution are required. Media transport mechanics intermittently decelerate the film media to allow static, frame-by-frame projection and, for digitization, two-dimensional image capture. In general, film loops are required to account for the frame-by-frame deceleration requirement for projection. U.S. Pat. No. 4,022,525 employs uncontrolled loops only presumed to provide sufficient slack to account for the individual frame deceleration and projection times. U.S. Pat. No. 6,120,151 provides an improved system where the individual film media frames are compressed into mechanical cartridges and from which the frames are decelerated for individual projection.

Generally, stop-motion systems are disfavored in many different applications due to not least the mechanical complexity and substantial media wear incurred by such systems. The repeated, high-frequency impulse flexion of the film media is well-recognized to directly limit the useful life of the film media. Additionally, the mechanics required to achieve the high deceleration rates necessary for nominal operating throughput rates are themselves a substantial source of non-linear media skew or weave and vibration, directly impacting the accuracy of reproduction.

Continuous transport systems are generally preferred where high-throughput is desired and, in many cases, to avoid the problems associated with stop-motion systems. These systems typically employ constant tensioning systems to align and control the speed of the film media through a film gate. A high-speed digital line scanner is typically positioned transverse to the film gate and configured with a line scan orientation perpendicular to the transport direction of the film media. As the film continuously passes through the film gate, digital scan lines are aggregated and images of the film media contents extracted.

By the nature of the line scanner and related electronics, potentially high throughput rates can be achieved by continuous transport systems. As film media speeds are increased, however, the quality of the image produced by conventional continuous transport systems is progressively compromised. Image accuracy is lost predominantly due to the increasing impact of media transport speed variations and associated randomly varying skew imposed on the media as the media passes through the film gate. Conventional attempts to alleviate these problems have been made by augmenting continuous film media feed systems with a perforation detector, as shown in U.S. Pat. No. 6,091,446, and improved speed control electronics, as shown in U.S. Pat. No. 6,169,571. Use of a perforation detector allows associated electronics to measure the weave movement of the media, at least as between successive sprocket holes, and thereby permit a corresponding correction in the physical positioning of the line scanner. The speed of the film media can be better maintained by actively monitoring, using suitable electronics, the speed and phase relationship of both the sprocket drive and a tensioning capstan positioned at either end of the film gate.

Increasing speed also tends to impose increasing tensional loads on the film media, both intended to better maintain media positioning and unintended as a consequence of proportionally increased speed variation. Additionally, increased speed also increases both mechanical and media wear. Although generally less than the impulse loads and wear imposed by stop-motion systems, increased speed factors directly into an increased risk of loss of information and throughput should the film media be damaged or break. Short of catastrophic media failures, higher speeds conventionally result in increased routine maintenance requirements, increased unscheduled repairs, and decreased overall media life.

A somewhat related throughput problem is that the typical complexity of the film transport path leads to difficulties in loading and aligning new film rolls. Often, the film media must be threaded through and carefully aligned over a complex set of rollers and bails. The direct result is an effective loss of throughput due to the significant time taken to load new rolls and to reload rolls in the event of misalignment errors. The complexity of conventional film transport paths also leads to increased operator costs, particularly due to the need for increased system training and to continually monitor system operations.

Consequently, the practical maximum throughput speed of conventional continuous film media transport systems has been rather limited. Consequently, there is a clear need for a high-speed linear film transport system enabling continuous, highly accurate image recognition.

SUMMARY OF THE INVENTION

Thus, a general purpose of the present invention is to provide an efficient continuous linear film transport system that is operable at high-speeds and at low costs without loss of image accuracy and resolution while imposing minimal wear on the film media and transport system mechanics.

This is achieved in the present invention by providing a stable, continuous, high-speed roll film media path between supply and take-up film reels. Supply and take-up path segments, adjacent the ends of a core transport path section, each operate to continuously maintain open decoupling loops in the film media while accurately controlling the speed, tension and alignment of the film media as transported through the core transport path section. A microcontroller operates two motor driven capstans to establish the film media speed and tension within the core transport path section. Optical sensors provide feedback to the microcontroller in managing two additional motor driven capstans to maintain the decoupling loops. The film media within the core transport path section is thereby isolated from frictive, inertial, and skewing forces that could otherwise degrade the media imaging.

An advantage of the present invention is that greatly increased media transport speeds can be achieved without incurring any significant loss in the accurate reproduction of the documentary information present on the film roll. The film loops decouple the portion of the media passing through the film gate from the randomly varying frictive, inertial, and skewing forces introduced by the film reels, including the film roll bulk, bail arms, and various rollers outside of the core film gate transport path. Consequently, the media moves continuously at a controlled high speed through the film gate without incurring any significant loss of image quality.

Another advantage of the present invention is that the decoupling film loops are readily established and maintained in a relatively open atmosphere. Drive capstan to roller offsets are used to reliably orient the creation of the film loops. Infrared emitters and detectors are used to continuously measure the height of the loops. A feedback control routine, interoperating with the film transport motor speed control routines, is used to dynamically adjust the film transport speed outside of the core film gate transport path to maintain the height of the decoupling loops within defined tolerance ranges.

A further advantage of the present invention is that, within the core film gate transport path, high-tolerance film guides are able to maintain a highly linear orientation of the film media through the film gate. The guides and a single, well controlled tensioning roller apply an essentially non-varying friction force on the film media and, therefore, allow a highly linear transport speed to be maintained through the core film gate transport path.

Still another advantage of the present invention is that the film transport path is simple and direct. New film rolls can be loaded with minimal complication. The closure of the roller assembly against the capstans provides for both a self alignment of the film media to the guides within the core film gate transport path and an automatic, controlled offsetting of the drive rollers to drive capstans appropriate to provide for the creation and maintenance of the decoupling loops. Further, due to the reduced frictive and inertial forces imposed on the core film gate transport path, there is minimal operational wear on the tolerance critical rollers, capstans, motors and other parts of the film transport system. Consequently, a film transport system implementing the present invention will be able operate at significantly higher continuous speeds for longer periods of time between routine maintenance servicing.

DETAILED DESCRIPTION OF THE INVENTION

The present invention is applicable to the continuous digital line scanning and image conversion of various forms and formats of optical image film media, including motion picture film. The preferred embodiments of the present invention are specifically directed to the accurate, high-throughput image recovery and digitization of documents optically captured on roll microfilm media. The following description of the preferred embodiments should therefore not be construed as limiting the present invention only to roll microfilm use.

Figure 1:
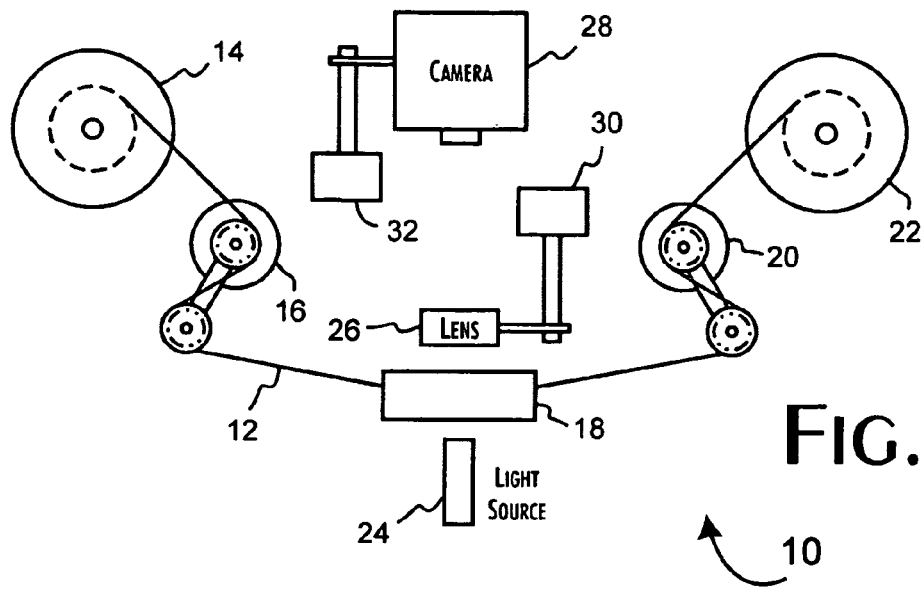
FIG. 1 is a schematic view of the continuous film transport path and line scanner system of the present invention.

Referring to FIG. 1, an overall view of a microfilm scanner system 10, constructed in accordance with a preferred embodiment of the present invention, is shown. Roll microfilm media 12 is streamed from a supply reel 14, through a supply tensioner system 16, a guide path 18 including a film gate, a take-up tensioner system 20, and collected onto a take-up reel 22. A light source 24 projects a narrow field image from the film media present within the film gate through a focusing lense 26 for capture by a line image digitizing camera 28. Preferably, the focusing lense 26 and camera 28 are separately adjustable, in line with the light source 24 and film gate, by microprocessor automated control of servo motor driven lead screws 30, 32.

Figure 2:
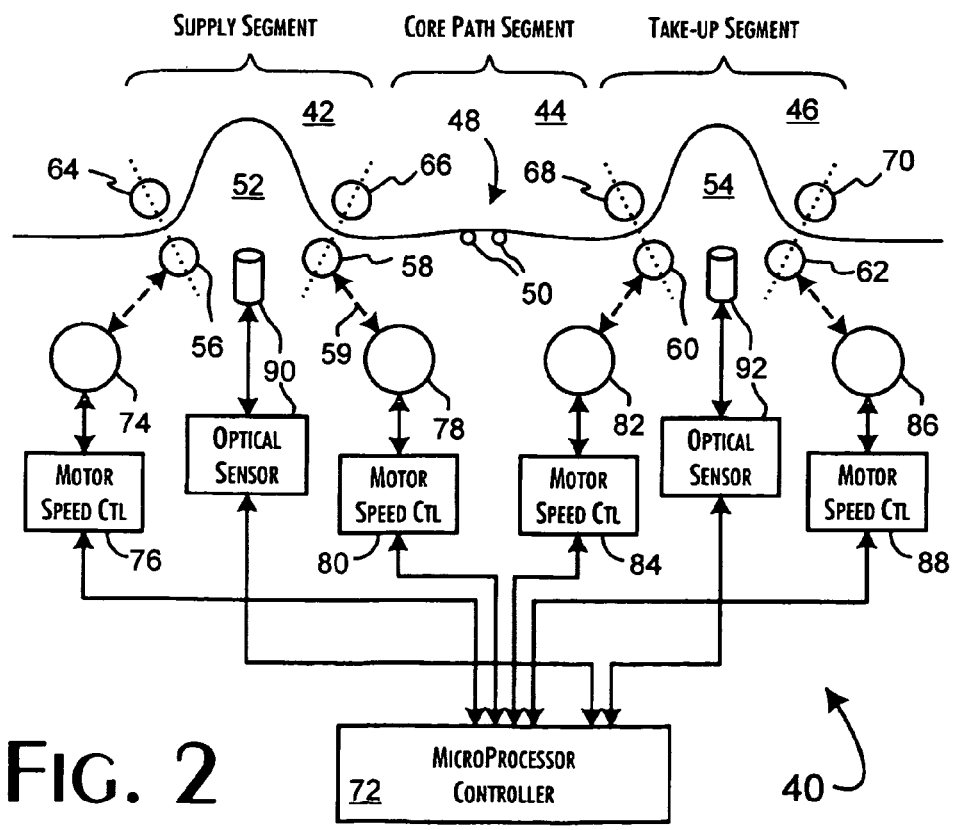
FIG. 2 is a schematic view of the continuous film transport path of the present invention further detailing the supply, core, and take-up path segments.

A detailed schematic view of the central transport path 40, representative of the implementation of a preferred embodiment of the present invention, is shown in FIG. 2. The central transport path 40 includes supply 42, core 44, and take-up 46 segments. The supply and take-up segments 42, 46 operate, in accordance with the present invention, to isolate the core path segment 44 from frictional and inertial loads arising from or otherwise associated with the supply and take-up reels 14, 22 and the supply and take-up tensioner systems 16, 20. The core path segment 44 provides a controlled tension, low friction guide path for film media through a central film gate 48 defined by two scroll bars 50. The supply and take-up segments 42, 46 each operate to create open-air decoupling loops 52, 54 in the film media 12. Preferably, drive capstans 56, 58, 60, 62 are inset relative to opposing pinch rollers 64, 66, 68, 70 sufficient to define the orientation of the loops 52, 54. An elevation of about 7.5 degrees in the film path is established by the scroll bars 50 relative to the inner capstans 58, 60.

In operation, a microprocessor controller 72 defines the speed of the supply drive capstan 56 using a direct connect supply capstan drive motor 74. Closed-loop speed management is performed using a rotary quadrature encoder-based motor speed controller 76. The speed of the film tensioning drive capstan 58, in the currently preferred embodiment, is managed open-loop by control of a pulse-width drive signal provided by the microprocessor controller 72 to tensioning drive motor 78 by a motor speed controller 80. In an alternate preferred embodiment, a rotary quadrature encoder-based motor speed controller 80 is used to allow the speed of the film tensioning drive capstan 58 to be managed closed-loop by the microprocessor controller 72. The speed of the film gate speed drive capstan 60 and film take-up drive capstan 62 are separately controlled closed-loop by the microprocessor controller 72 through a film gate speed drive motor 82 and rotary quadrature encoder-based motor speed controller 84, and take-up drive motor 86 and rotary quadrature encoder-based motor speed controller 88.

Preferably, the motor speed controllers 76, 84, 88, and speed controller 80 in the alternate embodiment, implement quadrature encoders configured to produce approximately 3.5 counts per micron (87,000 counts per inch). The encoder signals are processed by the microprocessor controller 72 using a conventional proportional, integral, and derivative (PID) feedback filter, to provide 4,000 capstan drive motor power corrections per second to each of the capstan drive motors 74, 80, 82, 86. This level of speed control has been found sufficient obtain a high-degree of image resolution accuracy in terms of both absolute film speed accuracy and repeatability. Given the 48× optical reduction ratio used on typical duplex microfilm roll media and a conventional target image output resolution of 300 dots per inch (dpi), a true resolution of 14,400 dpi is required. Empirically, a deviation of more than one pixel over a short distance, such as the size of a single imaged character, will appear as an evident flaw in the scanning process. The PID feedback filter control loop is capable of maintaining film speed to within an error rate of about seven quadrature counts or about 0.6 pixels.

The motor speed control accuracy is obtainable absent dynamic forces that impose variable loads, such as due to variable friction and inertial loads. Constant loads will not adversely affect the resultant accuracy of a scanned image because the motor speed control via the PID filter will always be the same amount behind the desired position, and so the resultant output will be linear and accurate, even though delayed by several pixels. Variable loads, conventionally arising from the dynamic characteristics of the transport bail arms, film spools, and film guides, can introduce multi-pixel errors over short distances. These errors can easily surpass five pixels over 20 pixel ranges, which are plainly noticeable to the unaided human eye.

Figure 3:
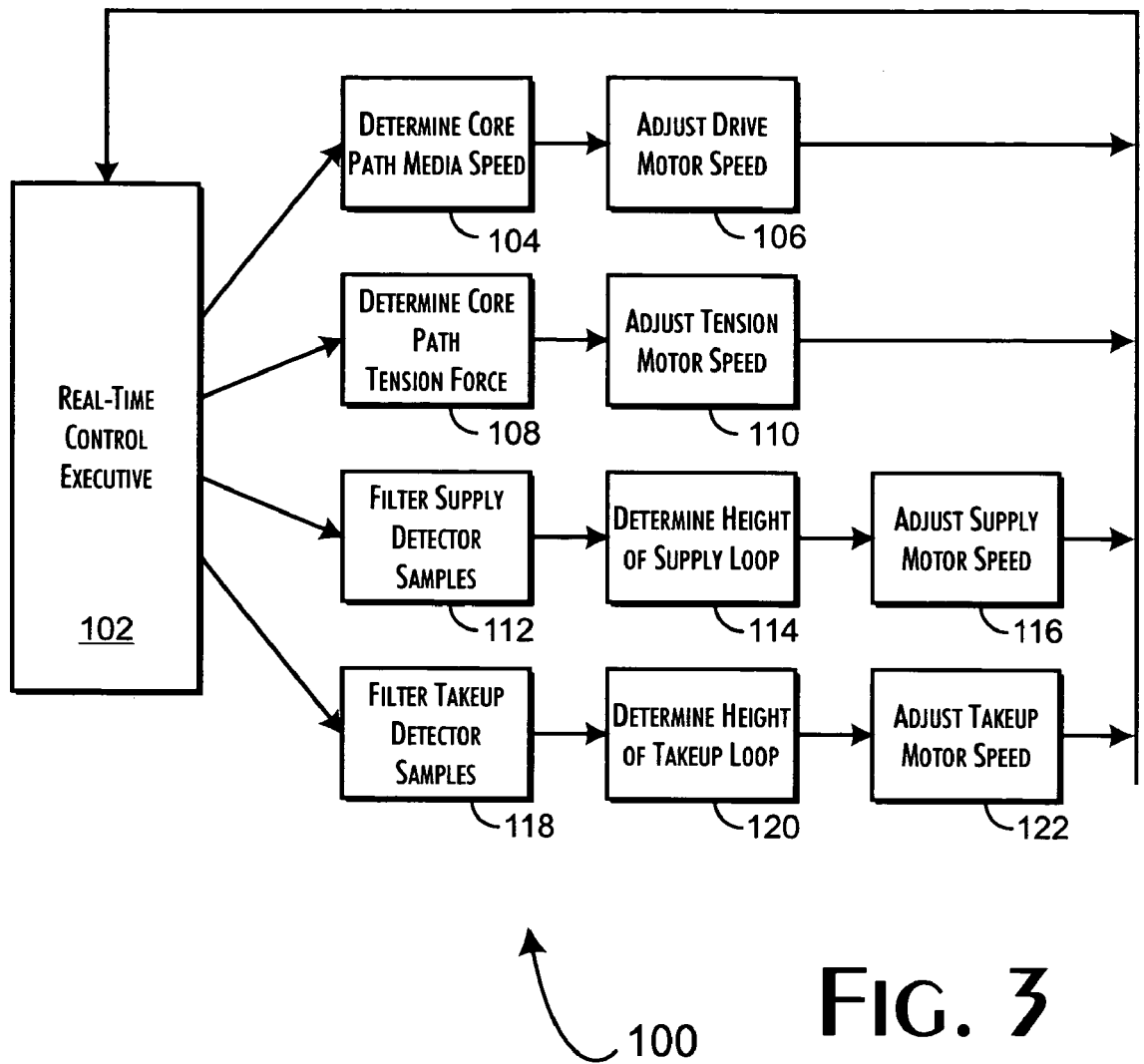
FIG. 3 is a software block diagram illustrating the principle control flows utilized in managing operation of the continuous film transport path of the present invention.

In accordance with the present invention, the film media loops 52, 54 operate to decouple any variable forces imposed on the film media 12 outside of the central transport path 40. Referring to FIG. 3, the control operation 100 of the microprocessor controller 72 is performed by a real-time control executive kernel 102. The control operation 100 provides independent control flows to monitor and adjust the speed of the capstan drive motors 74, 82, 86, and capstan drive motor 78 in the alternate embodiment. Preferably, the speed of the film gate speed drive motor 82 is determined 104 from the motor speed controller 84 and adjusted 106 to achieve a target film media transport speed. Film media transport speeds of 15 inches per second or more without significant loss of image resolution are achievable by the present invention.

The tensioning drive motor 78 is preferably connected to the film tensioning drive capstan 58 through a friction slip connection 59, allowing the speed and direction of the tensioning drive motor 78 to define a constant tensioning force that is applied as the film media 12 enters the core path segment 44. Preferably, the direction of rotation is set counter to the normal forward direction of the film media movement. For the preferred embodiment, the open-loop controlled film tensioning drive capstan 58 is preferably driven at fixed speeds, selected according to the target speed of the film media, to provide a constant tensioning force to the film media. While the specific tensioning force is not critical, a smooth and continuous force level of between four and six ounces is preferred. In the alternate embodiments, this tensioning force is calculated 108 based on the drive power levels applied to the film gate speed drive motor 82 and tensioning drive motor 78. The speed of the tensioning drive motor 78 is then adjusted 110 to set a desired tensioning force on the film media 12 sufficient to hold the film media stable through the film gate 48. In both embodiments, the tension level is intended to ensure that the film media travels linearly and remains flat across the scroll bars 50 through the film gate 48.

The supply capstan drive motor 74 is operated to provide a continuous supply of the film media 12 while maintaining the effective height of the supply decoupling loop 52. An optical sensor assembly 90, preferably implemented using a short range infra-red LED emitter, provides a distance proportionate range signal to the microprocessor controller 72. The range signal is sampled 112 and a loop height value computed 114. The speed of the supply drive capstan 56 is then adjusted to maintain the height of the loop 52 within target tolerance levels. The height of the loop is generally not critical and will be different depending on a number of factors including the width and material composition of the film medial 2, the target speed of the media 12 through the film gate 48, and the variability of frictive and inertial forces active outside of the central transport path 40. Maintaining a 0.5 inch to 1.5 inch loop height between capstans spaced at approximately three inches is generally sufficient for purposes of the present invention.

The take-up capstan drive motor 86 is similarly operated to maintain the height of the take-up decoupling loop 54. An optical sensor assembly 92 provides a range signal that is sampled 118 and used to compute the height of the take-up decoupling loop 54. The speed of the take-up capstan drive motor 86 is adjusted 122 to maintain the height of the decoupling loop 54 within target tolerances. Generally, the some 0.5 inch to 1.5 inch loop height is preferred for the take-up decoupling loop 54.

In accordance with the present invention, the decoupling loops 52, 54 are formed in free air, without requiring any complex of arc loop guides, atmospheric shields, or pressure controls. Film media guides are preferably provided only at the capstans to control the loop release and recapture of the film media 12. The open formation and operation of the decoupling loop 52 maximizes the isolation of variable frictive and inertial forces from the core path segment 44. The intrinsic strength of the film media 12, though variable depending on the width and material composition of the film media 12, is sufficient for at least the preferred heights of the loops 52, 54, to be insensitive to ordinary air pressure variations within the general system cover of the central transport path 40. Furthermore, the preferred use of infra-red LED emitters prevents interference with the height sensing of the loops 52, 54 by ordinary visible light sources.

Figure 4:
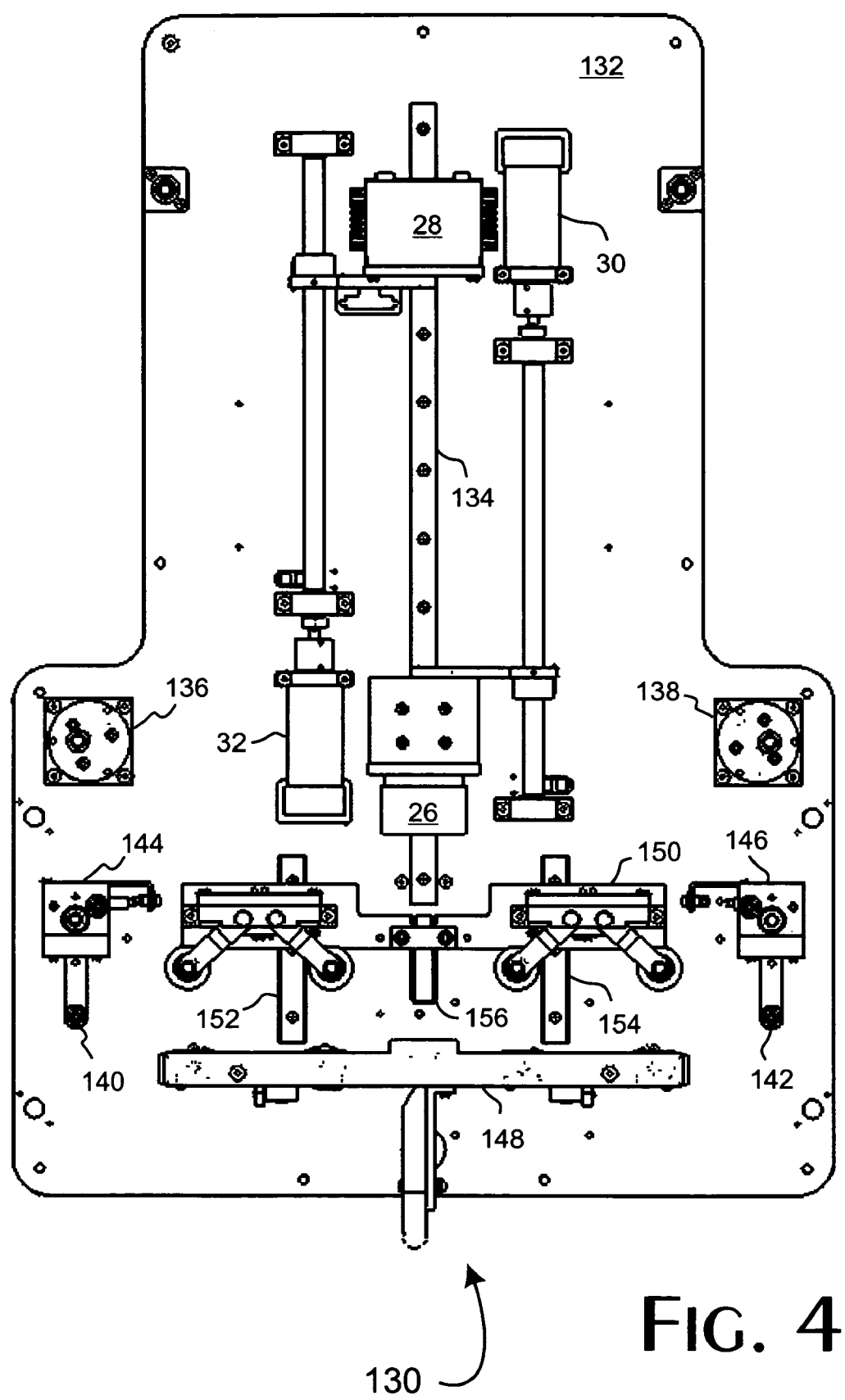
FIG. 4 is a full front view of the continuous film transport path and line scanner system of the present invention.

As generally shown in FIG. 4, the roll film path control mechanics 130, as implemented in a preferred embodiment of the present invention, are mounted as a unitary plate 132. The lense 26 and camera 28 are mounted on a common slide rail 134 that permits independent focal adjust by operation of servo motor driven lead screw assemblies 30, 32. Supply and take-up film media reels 14, 22 are driven by motors 136, 138. Bail arms 140, 142 are spring loaded to bail pivot mounts 144, 146. The bail arms 140, 142 are maintained in a centered range using potentiometer feedback control based on bail arm 140, 142 position to speed control the supply and take-up motors 136, 138.

A capstan and film gate guide assembly 148 is mounted to the plate 132 in a fixed position, generally as shown. A pinch roller assembly 150 is mounted to slide rails 152, 154 in parallel opposition to the capstan film gate guide assembly 148. The pinch roller assembly 150 is driven between an open position, as shown, and a closed position that places the pinch rollers in pressured contact with the capstans of the capstan and film gate guide assembly 148. Movement of the pinch roller assembly 150 is controlled by a lead screw 156 operated by a gear motor mounted on the back side of the plate 132.

Figure 5:
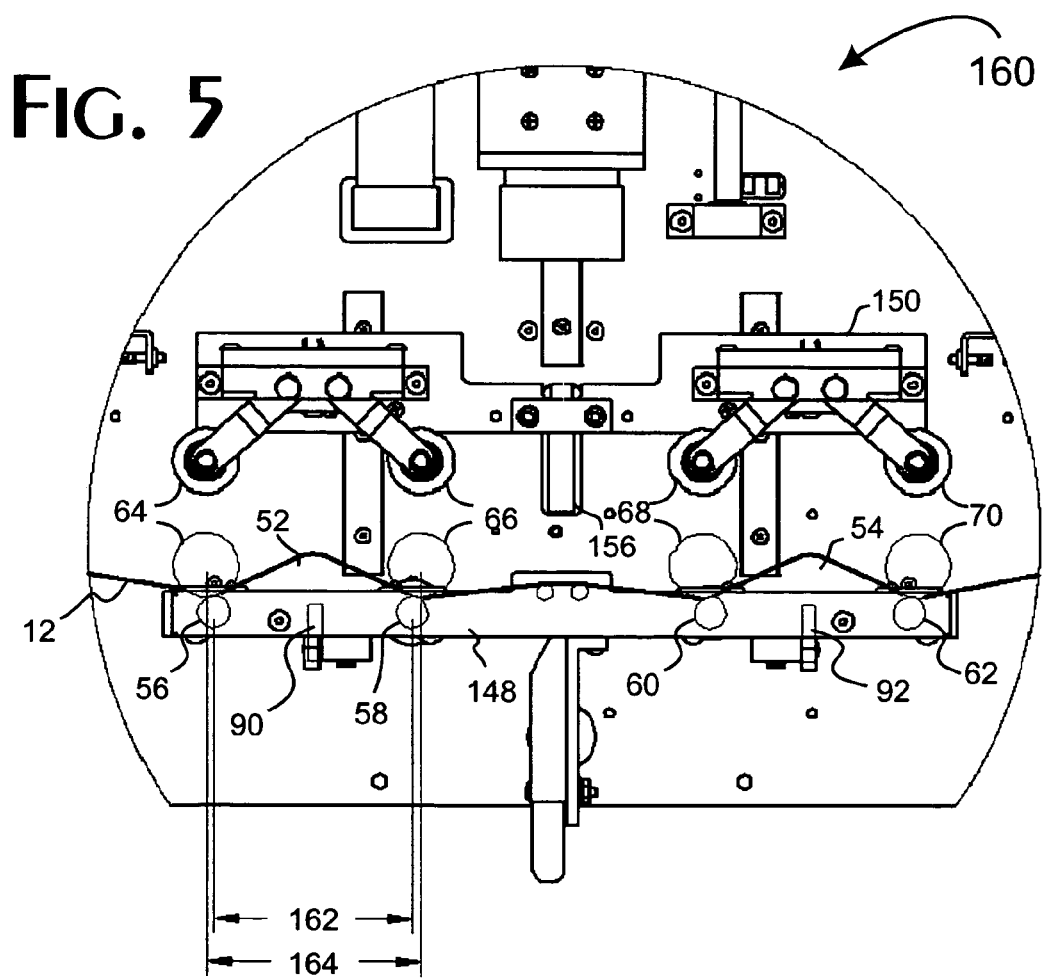
FIG. 5 is a front detail view of the pinch roller clamp assembly and film media guide path assembly as constructed in accordance with the present invention.

A detail view 160 of the roll film path control mechanics 130 is shown in FIG. 5. The detail view 160 illustrates the preferred positioning of the pinch rollers 64, 66, 68, 70 in the open and closed positions. In accordance with the present invention, in the closed position the pinch rollers 64, 66 and 68, 70 are outwardly offset from the capstans 56, 58 and 60, 62 to control the orientation of the film media loops 52, 54. In a preferred embodiment of the present invention, the center to center spacing 162 of the capstans 56, 58 and 60, 62 is three inches. In the closed position, the pinch rollers 64, 66 and 68, 70, having a nominal diameter of one inch, are provided with an approximately 3.25 inch center to center spacing 164. The optical sensors 90, 92 are mounted to capstan and film gate guide assembly 148 at points centered between the capstans 56, 58 and 60, 62.

Figure 6:
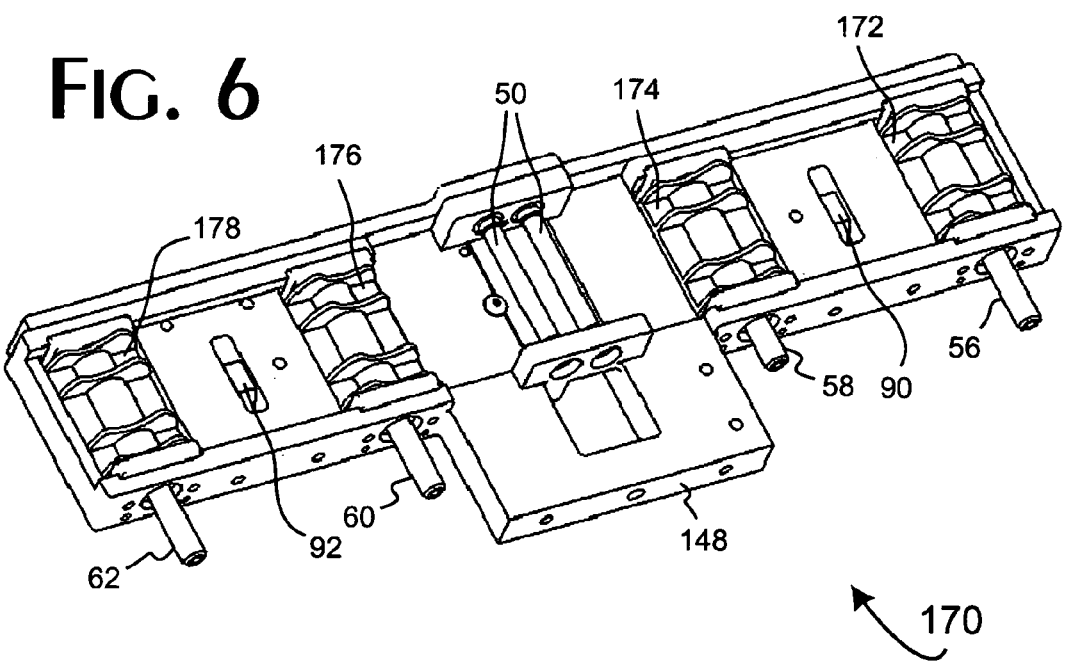
FIG. 6 is a perspective view of the film media guide path assembly as constructed in accordance with the present invention.

A perspective view 170 of the capstan and film gate guide assembly 148 is shown in FIG. 6. The drive shafts of the capstans 56, 60, 62 are extended, in the preferred embodiments, to connect directly to the drive shafts of the capstan drive motors 74, 82, 86, which are mounted on the back side of the plate 132. The drive shaft of the tensioning drive capstan 58 is connected through a friction slip connection 59 to the drive shaft of the tensioning drive motor 78, which is also mounted on the back side of the plate 132. Opening in the base of the capstan and film gate guide assembly 148 are provided through which the optical sensors 90, 92 extend.

Figure 7:
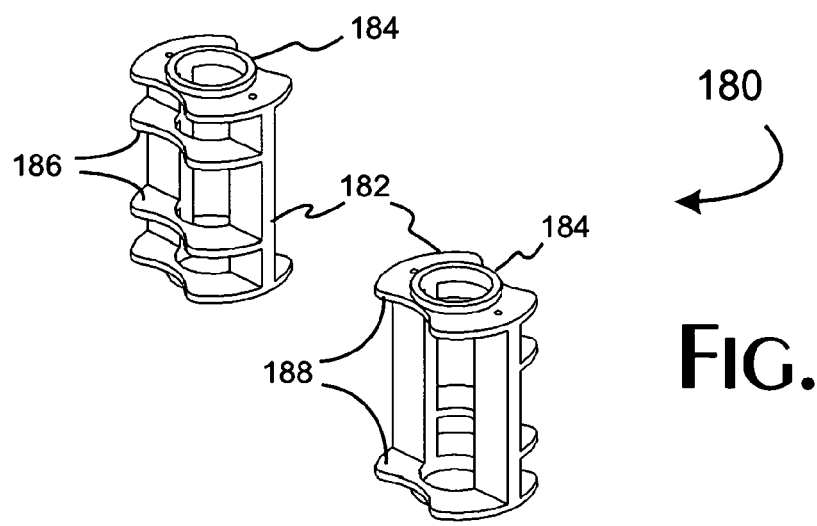
FIG. 7 is a perspective detail view of the reversible film media guides as constructed in accordance with the present invention.

Film media guide units 172, 174, 176, 178 are mounted concentric to the capstans 56, 58, 60, 62. As shown in FIG. 7, each film guide unit 182 includes end bearing surfaces 184 that supports the guides 172, 174, 176, 178 and allows rotation independent of the capstans 56, 58, 60, 62. Detent positions preferably enable the guide units 172, 174, 176, 178 to be reversibly oriented to present either 16 millimeter guide surfaces 186 or 35 millimeter guide surfaces 188. Preferably, the film guide units 172, 174, 176, 178 are machined to a tolerance of 0.001 inches and plated to have a surface hardness twice that of conventional stainless steel. The concentric mounting of the film guide units 172, 174, 176, 178 and capstans 56, 58, 60, 62 preferably places the inner edges of the guide surfaces 186, 188 to within a tolerance of approximately 0.004 inches of the capstan 56, 58, 60, 62 surfaces.

Figure 8:
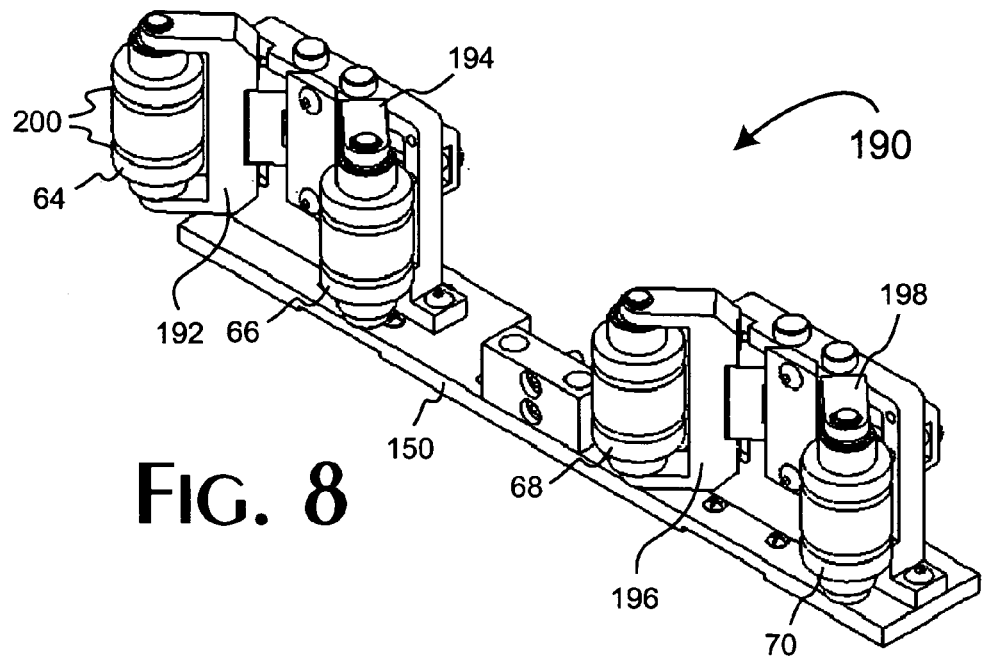
FIG. 8 is a perspective detail view of the pinch roller clamp assembly as constructed in accordance with the present invention.

A detail view 190 of the pinch roller assembly 150 is shown in FIG. 8. The pinch rollers 64, 66, 68, 70 are mounted in individual bracket arms 192, 194, 196, 198 that are connected through centering, spring loaded pivots to the frame of the pinch roller assembly 150. Each pinch roller 64, 66, 68, 70 has a designed width to fit within the 35 millimeter guide surfaces 188. A pair of grooves 200 are provided in each pinch roller 64, 66, 68, 70 to accommodate insertion of the 16 millimeter guide surfaces 186. The axial mounting of the pinch roller 64, 66, 68, 70 preferably permits compression adjustment to minimize the roller outer edge to guide surface 188 and groove to guide surface 186 spacing to ensure that the film media edges remain flat on the capstans 56, 58, 60, 62 perpendicular to the guide surfaces 186, 188 during operation.

Thus, a high-speed continuous linear film media transport system has been described. While the present invention has been described particularly with reference to microfilm media, the present invention is equally applicable to the scanning of cinematic and other continuous strip film media generally for purposes of display and digitization.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A continuous film transport assembly providing a stable, high-speed core transport path for scanning roll film media transported between supply and take-up reels, said continuous film transport assembly comprising:
   a) a first transport path section providing for the establishment of a first decoupling loop in film media as continuously transported through said first transport path section;
   b) a core transport path section coupled to continuously receive film media from said first transport path section, said core transport path section including a first capstan driven by a first speed controlled motor to define a fixed transport speed for film media as transported through said core transport path section, a second capstan driven through a friction slip connection by a second speed controlled motor to define a fixed tension on film media as transported through said core transport path section, wherein the direction of rotation by said second speed controlled motor being counter to the transport direction of film media transported through said core transport section, and wherein said core transport path further provides for the passive transport of film media between said first and second capstans; and
   c) a second transport path section coupled to continuously receive film media from said core transport path section, said second transport path section providing for the establishment of a second decoupling loop in film media as continuously transported through said second transport path section;
   whereby variable forces associated with the supply and take-up reels are isolated by said first and second decoupling loops from said core transport path.

2. The continuous film transport assembly of claim 1 further comprising a controller, coupled to said first and second speed controlled motors to establish a fixed speed for said first capstan and to adjust the speed of said second motor to establish a predetermined tension in film media transported through said core transport path section, and wherein said first transport section includes:
   a) a third capstan, driven by a third speed controlled motor, disposed to establish said first decoupling loop between said second and third capstans; and
   b) a supply loop sensor coupled to said controller and positioned with respect to said first decoupling loop to measure a supply loop distance directly representing the height of said first decoupling loop, said controller being operative to independently adjust the speed of said first speed controlled motor to establish said first speed for said first capstan, independently adjust the speed of said second speed controlled motor to establish said predetermined tension, and independently adjust the speed of said third speed controlled motor to maintain the height of said first decoupling loop within predetermined tolerances.

3. The continuous film transport assembly of claim 2 wherein said supply loop sensor is an infrared emitter/detector disposed to measure said supply loop distance as a distance perpendicular to a tangent of said first decoupling loop.

4. The continuous film transport assembly of claim 2 further comprising first and second rollers mounted parallel to and positioned offset outwardly with respect to second and third capstans to enable establishment of said first decoupling loop as an open air loop with an enforced orientation relative to said second and third capstans.

5. The continuous film transport assembly of claim 2 wherein said second transport path section includes:
  a) a fourth capstan, driven by a fourth speed controlled motor, disposed to establish said second decoupling loop between said fourth and first capstans; and
  b) a take-up loop sensor coupled to said controller and positioned with respect to said second decoupling loop to measure a take-up loop distance directly representing the height of said second decoupling loop, said controller being operative to independently adjust the speed of said fourth speed controlled motor to maintain the height of said second decoupling loop within predetermined tolerances.

6. The continuous film transport assembly of claim 5 further comprising first and second rollers mounted parallel to and positioned offset outwardly with respect to second and third capstans to enable establishment of said first decoupling loop as an open air loop with a first enforced orientation relative to said second and third capstans and third and fourth rollers mounted parallel to and positioned offset outwardly with respect to fourth and first capstans to enable establishment of said second decoupling loop as an open air loop with a second enforced orientation relative to said fourth and first capstans.

7. The continuous film transport assembly of claim 6 wherein said supply loop and take-up sensors are infrared emitter/detectors disposed to measure said supply loop and take-up loop distances as distances perpendicular to tangents of said first and second decoupling loops, respectively.

8. A continuous feed roll microfilm media transport system enabling high-speed, high-accuracy scan line digitization of document images present on the media, said transport system comprising:
  a) a supply reel tensioning system operable to provide a continuous supply of microfilm media;
  b) a take-up reel tensioning system operable to take-up a continuous supply of microfilm media; and
  c) a microfilm gate system coupled between said supply and take-up reel tensioning systems, said microfilm gate system including first and second microfilm media transport path segments disposed respectively at the feed and take-up ends of a microfilm gate transport path segment, wherein said first and second microfilm media transport path segments respectively maintain controlled, open-air decoupling loops in the microfilm media, wherein the height of said decoupling loops is maintained within predetermined tolerances by speed adjustment of first and second motor driven capstans located at the outer ends, relative to said microfilm gate transport path segment, of the first and second microfilm media transport path segments, wherein said microfilm gate transport path segment includes third and fourth motor driven capstans located at the ends of said microfilm gate transport path segment that exclusively define the speed and tension on microfilm media transported between said third and fourth motor driven capstans, said microfilm gate transport path segment further including first and second passive rolling scroll bars located between said third and fourth motor driven capstans and define a gate region within which microfilm media is supported for digitization of document images and wherein the speed of said third and fourth motor driven capstans is controlled independent of the speed of said first and second motor driven capstans such that the speed of said third motor driven capstan accurately determines the speed of the microfilm media through said microfilm gate transport path segment.

9. The continuous feed roll microfilm media transport system of claim 8 further comprising:
  a) first and second optical sensors positioned opposite said decoupling loops to provide first and second signals responsive to the respective heights of said decoupling loops; and
  b) a controller coupled to control the speed of said first and second motor driven capstans in response to said first and second signals.

10. The continuous feed roll microfilm media transport system of claim 9 wherein said fourth motor driven capstan includes a slip clutch driven by a tension motor and wherein said controller is operative to control the speed and direction of rotation of said tension motor to apply a predetermined constant level of tension to the microfilm media passing through said microfilm gate transport path segment, the controlled direction of rotation by said tension motor including a direction counter to the transport direction of the microfilm media passing through said microfilm gate transport path segment.

11. The continuous feed roll microfilm media transport system of claim 8 further comprising a roller clamp assembly including a pinch roller bar disposed parallel to and adjustable perpendicular to the nominal plane of the microfilm media in said microfilm gate transport path segment, said pinch roller bar including first, second, third, and fourth rollers mounted parallel to and pinch engageable with said first, second, third, and fourth motor driven capstans, wherein said first and second rollers are positionable offset outwardly with respect to said first and second motor driven capstans in a plane parallel to said pinch roller bar, and wherein said third and fourth rollers are positionable offset outwardly with respect to said third and fourth motor driven capstans in said plane parallel to said pinch roller bar.

12. The continuous feed roll microfilm media transport system of claim 11 wherein said first and second rollers are positioned offset outwardly with respect to said first and second motor driven capstans when in pinch engagement with said first and second motor driven capstans and wherein said outward offset is within a predetermined tolerance to directionally define a controlled, open-air decoupling loop in the microfilm media.

13. A method of performing a high-speed, continuous digital scan of a linear film media that enables accurate digital reproduction of images from the film media at high transport speeds, said method comprising the steps of:
  a) decoupling non-linear forces operative on a linear film media by creating and maintaining open loops in said linear film media at the entry and exit of a core film media path;

b) controlling the speed of said linear film media through said core film media path using closed-loop speed control of a media drive capstan;

c) maintaining a constant tensioning force on said linear film media as said linear film media traverses a film gate portion of said core film media path using a tensioning capstan driven by a closed-loop speed controlled tensioning motor through a friction slip connection; and d) supporting said linear film media at the entry and exit of said film gate portion with scroll bars disposed in a gate plane parallel to and raised above a base plane containing said media drive capstan and said tensioning capstan.

14. The method of claim 13 wherein said step of maintaining a constant tensioning force includes speed adjustment of said tensioning motor dependent on the speed of said media drive capstan and independent of the speed of said linear film media as said linear film media enters said core film media path entry loop and exits said core film media path exit loop, wherein the speed adjustment of said tensioning motor includes control over the direction of rotation by said tensioning motor including a direction of rotation direction counter to the direction of rotation of said tensioning capstan.

15. The method of claim 14 wherein the step of maintaining includes a step of measuring the heights of said core film media path entry loop and said core film media path exit loop.

16. The method of claim 15 wherein said step of maintaining includes a step of guide controlling the entry and exit of said linear film media on entry and exit from said core film media path entry loop and on entry and exit from said core film media path exit loop.

17. The method of claim 16 wherein said step of decoupling includes a step of creating said core film media path entry loop and said core film media path exit loop using first rolling surfaces offset from second rolling surfaces to bias the direction of formation of said core film media path entry loop and said core film media path exit loop.

* * * * *